July 4, 1933. J. C. SHREEVE 1,917,070
BALL JOINT LUBRICATOR
Filed March 17, 1932
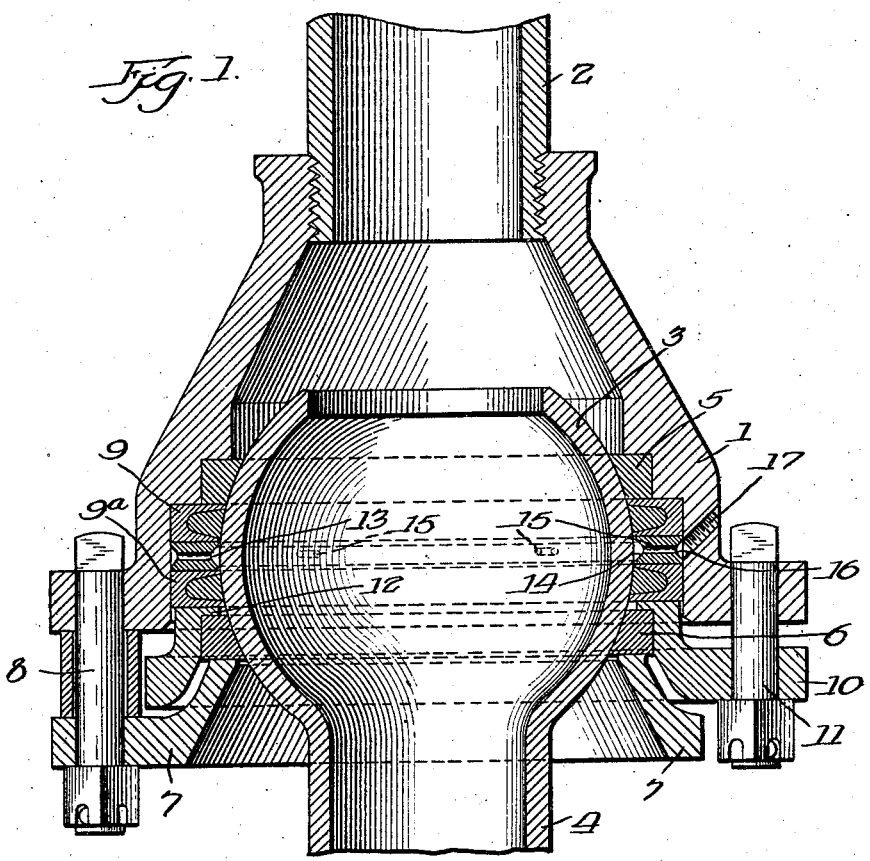
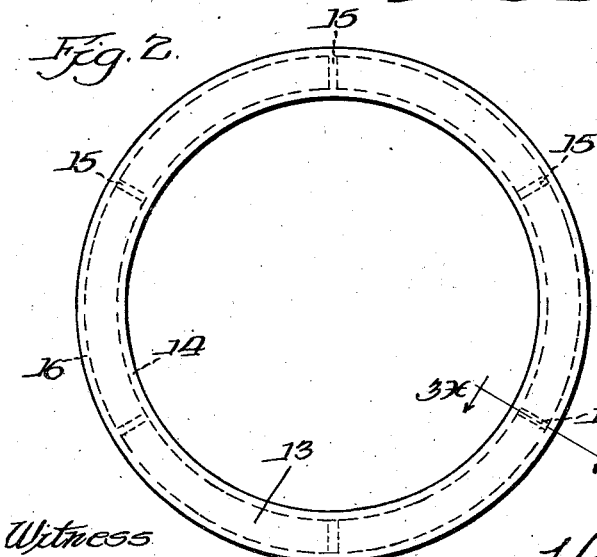
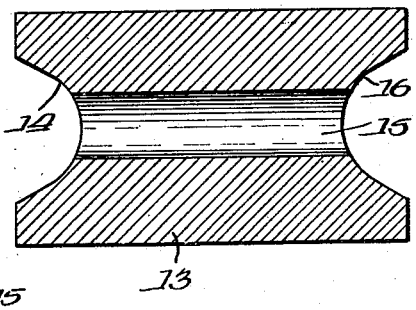
Inventor;
John C. Shreeve
By Weina Rauber
Attys.
Witness
R.B.Davison.

Patented July 4, 1933

1,917,070

UNITED STATES PATENT OFFICE

JOHN C. SHREEVE, OF JOLIET, ILLINOIS

BALL JOINT LUBRICATOR

Application filed March 17, 1932. Serial No. 599,409.

This invention relates to joints for rendering flexible, fluid conduits such for instance, as the conduit through which steam is supplied to a booster of a locomotive. In such joints it is necessary to establish the conditions of universal flexibility together with secure packing against leakage of live steam under pressure. These conditions are ordinarily realized by introducing a hollow spherical member, called the "ball," having connection with one member of the conduit, into a shell, having connection with the other member of the conduit and confining it there and packing it against escape of steam by means which, while preventing axial displacement, are intended to leave the joint free to yield to forces applied in directions perpendicular to the axis of the conduit, but illy serve their purpose owing to the binding of the retaining and packing means against the spherical surface.

The object of the invention is to provide an effective and durable means whereby the ball surfaces which move relatively to the locking and packing elements, may be kept lubricated, notwithstanding heavy impingement of the locking and packing elements thereagainst.

In ball joints of the kind described, it is usual to employ a pair of spaced bearing rings embracing small circles of the spherical member of the joint; one of said rings being seated in the shell and the other being supported by an adjustable bearing ring flange which tends to force said rings together and thereby lock the ball against displacement in the direction of its axis; and to pack this joint against the escape of the fluid medium flowing through the conduit of which the ball and shell form a part, packing rings are located in the space between said bearing rings. But in this arrangement as heretofore designed, angular movement of the ball member of the conduit causes the bearing rings and the packing rings to wipe the surface of the ball so severely that it is impracticable to sufficiently lubricate the parts and breakage frequently results from high flexing resistance opposed to shocks which, in the presence of proper lubrication would be absorbed by the flexing function of the joint. Attempts have been made to deliver lubricant into the space between the bearing rings, but owing to insufficient distribution these attempts have usually been unsuccessful.

The present invention meets the problem above outlined by employing two packing rings in the space between the bearing rings; spacing these packing rings apart so as to provide a lubricant reservoir between them; insuring maintenance of this reservoir by the provision of a special construction of lubricating ring which includes storage or reservoir spaces in its design; and, incidentally, utilizing this lubricating ring to secure a better distribution of pressure between the packing rings and therefore a more accurate justification of the intended positions of the packing rings relatively to the spherical surfaces against which they bear.

In the accompanying drawing, in which the preferred embodiment of the invention is shown by way of illustration—

Figure 1 is an axial sectional view of a ball joint embodying the subject-matter of the present invention.

Figure 2 is a detail view of the lubricating ring employed in Figure 1; and

Figure 3 shows, on a greatly enlarged scale, a radial section of the packing ring shown in Figures 1 and 2.

1 represents the shell of the joint adapted to stand in communication with one portion 2 of a conduit, for instance, the conduit which supplies steam to the booster on a locomotive; and 3 is the ball confined within said shell and standing in communication with the portion 4 of the said conduit so that said conduit portions 2 and 4, when the ball 3 is properly mounted within the shell, are relatively movable in directions at an angle to the longitudinal axis of the conduit.

To confine ball 3 within shell 1, an upper or fixed bearing ring 5 is stepped within the shell in position to embrace one minor circumference of the ball 3 and a lower or adjustable ring 6 is supported by bearing ring flange 7 in position to embrace a minor circumference of said ball that is axially remote from the ring 5, so that when bearing ring flange 7 is adjusted axially, for instance, through the medium of the usual flange bolts 8, only one of which is shown, the ball will be firmly locked against axial displacement but not confined against angular movement relatively to shell 1. In order to pack the outer surface of ball 3 against the escape of fluid flowing through the conduit, for instance, steam, packing rings 9, 9a are located in the space between the bearing rings 5 and 6, these packing rings being preferably of so-called V-construction with an insert of packing material which better suits them for their purpose; and these packing rings, usually two in number, even when directly bearing one against the other are on opposite sides of a great circle of the ball and have their ball-impinging surfaces specially designed so that they may be forcibly set up against the packed spherical surface by means of the adjustable packing flange 10 likewise held in position by bolts such as 11, of which one only is visible in a section such as shown in Figure 1. Pressure applied to lower bearing ring 6 by flange 7 is transmitted in part through shoulder 12 on the packing flange to the packing rings 9, 9a.

As thus far described, the device is of known construction and frequently suffers deterioration by high resistance to flexure when the locking and packing elements are put under sufficient pressure to prevent the escape of steam, owing to the fact that sufficient lubricant cannot be maintained between the spherical surface of ball 3 and the elements 5, 6, 9 and 9a. The present invention remedies this disadvantage by spreading apart the packing rings 9, 9a and introducing between them a lubricating ring 13, which is advantageously made of brass or other alloy, and this lubricating ring serves the function of definitely spacing apart packing rings 9, 9a under any pressure that can be applied to them and maintaining a lubricant reservoir in the form of an inner channel 14 presented toward the spherical surface of the ball, which channel extends preferably entirely around the ring so as to insure complete distribution of lubricant to the ball; and to better supply said reservoir 14 and insure such distribution, the lubricating ring is provided with a series of radial ducts 15 leading from a provisional reservoir in the form of an external groove 16, into which lubricating medium may be introduced voluntarily at appropriate intervals by applying lubricant supply under pressure at the charging port 17. By this arrangement, the rings, which by their severe wiping action under pressure necessary to proper checking of the escape of steam formerly kept the joint so dry as to cause breakage by resistance to flexure under service shocks, serve, in connection with the spaced packing rings, as a means for regulating the escape of lubricant stored in the reservoir between the packing rings; the lubricating ring, by its provisional supply chamber, causes equal distribution of lubricant to all of the impinging surfaces; and resistance to flexure of the joint is so far reduced that breakage is eliminated. Moreover, the lubricating ring, being of rigid permanent form, serves to justify the radial positions of the packing rings under the severe pressure of the bearing rings, and the packing remains tight for a longer period.

What is claimed is:

In a ball joint for conduits, the combination of a shell adapted to communicate with one conduit member, a ball adapted to communicate with another conduit member, a built up column of packing occupying the space between said ball and said shell and comprising substantially rigid packing rings each having a spherical surface engaging the corresponding surface on opposite sides of a great circle of the ball, a substantially rigid lubricating ring located between and in contact with the packing rings, and engaging a great circle of the ball and an adjustable packing flange adapted to apply pressure to said column of packing with the pressure distributed equally throughout substantially the width of the column; whereby a leak proof fit is maintained between the spherical surfaces on the packing rings and the ball on opposite sides of the lubricating ring.

Signed at Joliet, Illinois, this 12th day of March, 1932.

JOHN C. SHREEVE.